Figure 1:
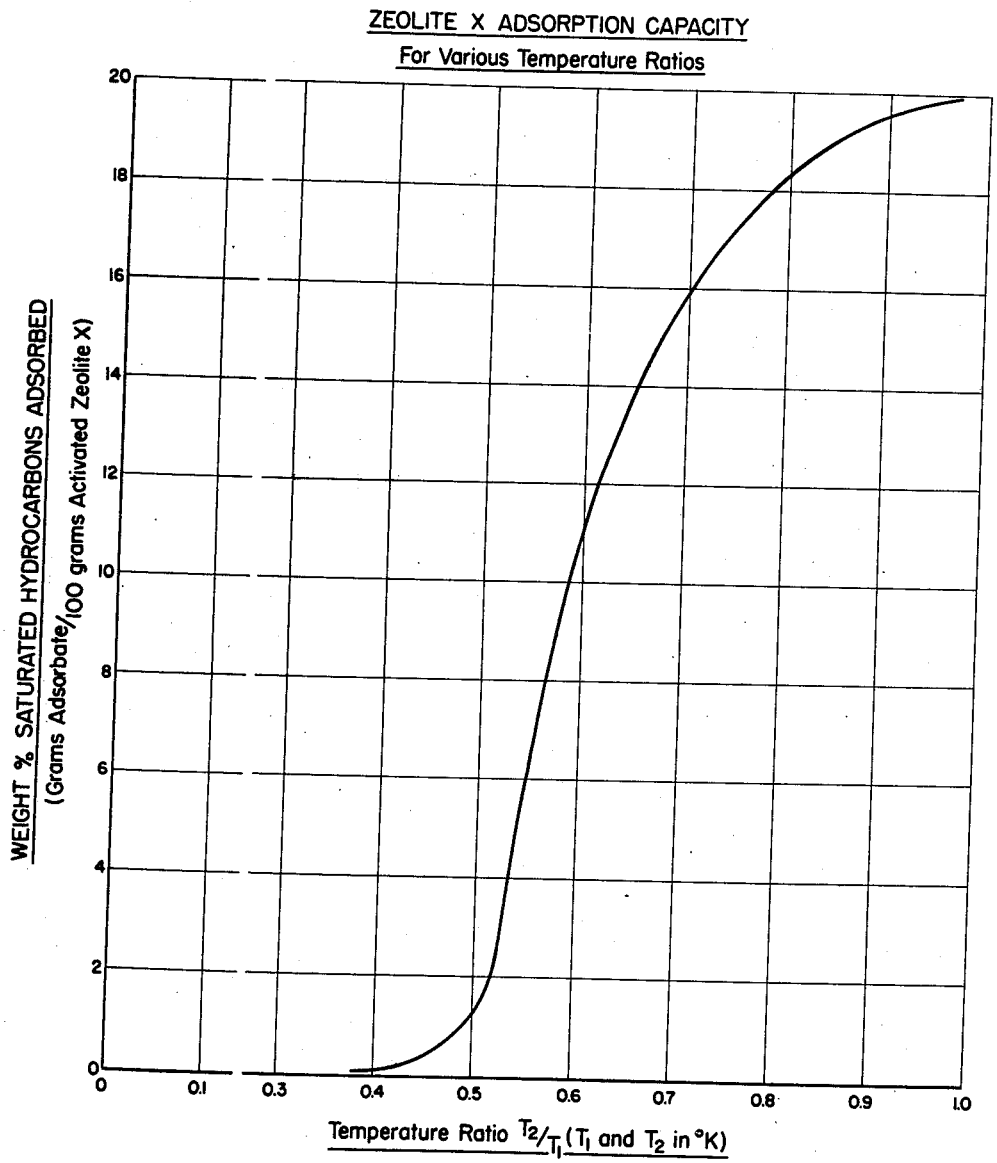

United States Patent Office 3,078,642
Patented Feb. 26, 1963

3,078,642
SEPARATION OF ISOBUTANE FROM LIGHTER SATURATED HYDROCARBONS
Robert M. Milton, Buffalo, N.Y., assignor to Union Carbide Corporation, a corporation of New York
Filed Dec. 31, 1959, Ser. No. 863,286
11 Claims. (Cl. 55—75)

This invention relates to a method for adsorbing fluids and separating a mixture of fluids into its component parts. More particularly, the invention relates to a method of separating isobutane from a mixture thereof with lower molecular weight saturated hydrocarbons with adsorbents of the molecular sieve type. Still more particularly, the invention relates to a method for preferentially adsorbing isobutane from admixture with methane in a fluid mixture such as fuel gas. This application is a continuation-in-part of copending patent application Serial No. 400,386, filed December 24, 1953, which has been abandoned.

Illustrating the utility of this invention, it may, for example, be desirable to recover ethane, propane, and higher molecular weight saturated hydrocarbons from fuel gas which has methane as the major component. Such a recovery process would provide a good source of ethane and propane without impairing the heating value of the predominantly methane by-product gas of the recovery process. Of the minor components of fuel gas, ethane is normally the largest single component with higher molecular weight components being present in proportions which decrease with increasing molecular weight. Ethane and propane, particularly, may be recovered quantitatively from fuel gas for subsequent use in other processes by the present adsorption process. These hydrocarbons are very important raw materials, particularly in the manufacture of ethylene and propylene.

Broadly, the invention comprises mixing molecules, in a fluid state, of the materials to be adsorbed or separated with a crystalline synthetic dehydrated zeolite X, and effecting the adsorption of the adsorbate by the zeolite. Zeolite X, and the methods for making zeolite X are described in detail and claimed in U.S. patent application Serial No. 400,389, filed December 24, 1953, now U.S. Patent No. 2,882,244 issued April 14, 1959, in the name of R. M. Milton.

It is the principal object of the present invention to provide a process for the selective adsorption of molecules from fluids. A further object of the invention is to provide a method whereby certain molecules may be adsorbed and separated by crystalline synthetic zeolite X from fluid mixtures of those molecules and other molecules.

In the drawing, FIGURE 1 is a graph showing the amount of $C_1$–$C_8$ saturated aliphatic hydrocarbons adsorbed versus the temperature ratio $T_2/T_1$ for zeolite X.

The formula for zeolite X may be written as follows:

$$0.9 \pm 0.2 M_{\frac{2}{n}}O : Al_2O_3 : 2.5 \pm 0.5 SiO_2 : YH_2O$$

In this formula "M" represents a metal, "$n$" its valence, and "Y" may be any value up to 8 depending on the identity of the metal and the degree of hydration of the crystal. X-ray diffraction data may be employed to define the crystal structure of zeolite X. Such information and processes for synthesizing zeolite X are provided in U.S. Patent No. 2,882,244.

The adsorbents contemplated herein include not only the sodium form of zeolite X which is a common form produced but also crystalline materials obtained from such a zeolite by partial or complete replacement of the sodium ion with other cations. Sodium cations can be replaced, in part or entirely by other ions. For example, this may be accomplished by ion exchange techniques.

In the tables which follow, the term "Weight percent adsorbed" refers to the percentage increase in the weight of the adsorbent. The adsorbent was activated by heating it at a reduced pressure to remove adsorbed materials. Throughout the specifications the activation temperature for zeolite X was 350° C., and the pressure at which it was heated was less than about 0.1 millimeter of mercury absolute unless otherwise specified. Likewise, the pressure given for each adsorption is the pressure of the adsorbate under the adsorption conditions unless the contrary is specified.

In the series of saturated aliphatic hydrocarbons, the higher molecular weight molecules are adsorbed much more readily than the lower molecular weight homologs. In particular, methane is only slightly adsorbed by zeolite X as compared to the higher homologs. This is shown in the data of Table I. In Table I, all of the adsorptions were carried out at 25° C., except where otherwise indicated.

An important characteristic of zeolite X is its property of adsorbing large amounts of adsorbates at low adsorbate pressures, partial pressures, or concentrations. This property makes zeolite X useful in the removal of adsorbable impurities from gas and liquid mixtures, since it has a relatively high adsorption capacity even when the material being adsorbed from a mixture is present in very low concentrations. Efficient recovery of minor components of mixtures is also possible. High degree of adsorption at low pressures on zeolite X is also illustrated in Table I, along with some comparative data for silica gel and charcoal.

TABLE I

| Adsorbate | Adsorbent | Pressure, mm. Hg | Wt. percent Adsorbed |
|---|---|---|---|
| $CH_4$ | $Na_2X$ | 500 | Less than 1 |
| $C_2H_6$ | $Na_2X$ | 5 | 0.2 |
|  | $Na_2X$ | 25 | 0.8 |
|  | Silica Gel | 25 | 0.0 |
|  | Charcoal | 25 | 0.0 |
|  | $Na_2X$ | 300 | 3.3 |
|  | Silica Gel | 300 | 8.3 |
|  | Charcoal | 300 | 0.6 |
|  | $Na_2X$ | 700 | 8.8 |
|  | Silica Gel | 700 | 10.2 |
|  | Charcoal | 700 | 1.4 |
| $C_3H_8$ | $Na_2X$ | 1 | 11.4 |
|  | $Na_2X$ | 4 | 0.8 |
|  | Silica Gel | 4 | 2.6 |
|  | $Na_2X$ | 5 | 0.1 |
|  | $Na_2X$ | 25 | 3.1 |
|  | Silica Gel | 25 | 11.1 |
|  | $Na_2X$ | 700 | 0.8 |
|  | Silica Gel | 700 | 14.6 |
| n-$C_4H_{10}$ | $Na_2X$ | 700 | 6.5 |
|  | $Na_2X$ | 710 | 17.8 |
|  | $Na_2X$ | 729 | 17.6 |
| i-$C_4H_{10}$ | $Na_2X$ | 0.2 | 17.6 |
|  | Silica Gel | 0.2 | 2.4 |
| i-$C_4H_{10}$ | $Na_2X$ | 5.5 | 0.0 |
|  | Silica Gel | 5.5 | 11.5 |
|  | Charcoal | 5.5 | 0.7 |
|  | $Na_2X$ | 400 | 15.9 |
|  | Silica Gel | 400 | 18.4 |
|  | Charcoal | 440 | 11.8 |
| n-$C_5H_{12}$ | $Na_2X$ | 205 | 27.2 |
|  | $Na_2X$ | 224 | 18.4 |
| n-$C_6H_{14}$ | $Na_2X$ | 0.18 | 19.3 |
|  | $Na_2X$ | 0.22 | 4.8 |
|  | $Na_2X$ | 20 | 10.2 |
|  | $MgX$ | 20 | 19.2 |
|  | $BaX$ | 20 | 18.3 |
|  | $MnX$ | 20 | 15.8 |
|  | $Li_2X$ | 20 | 17.9 |
|  | $Ca_2X$ | 20 | 19.2 |
| n-$C_8H_{18}$ | $Na_2X$ | 11 | 16.1 |
|  | $Na_2X$ | 2.3 | 30 |
|  | $Na_2X$ | 5.0 | 20.8 |
|  | $Na_2X$ | 2.3 ($T_1$=150° C.) | 20.8 |
|  | $Na_2X$ | 5.0 ($T_1$=150° C.) | 14.2 |
|  |  |  | 14.2 |

An advantage that may be taken of this high adsorption capacity at low pressures is the operation of adsorption processes at higher temperatures than are normally used with common adsorbents. The adsorptive power of physical adsorbents usually decreases with increasing temperature, and therefore while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures.

Zeolite X may be used as an adsorebnt for the purposes indicated above in any suitable form. For example, a column of powdered crystalline material has given excellent results as has a pelleted form obtained by pressing into pellets a mixture of zeolite X and a suitable binding agent such as clay.

The present process for separating isobutane from vapor mixtures thereof with lower molecular weight saturated aliphatic hydrocarbons depends upon interrelated properties of zeolite X with respect to the adsorbed phase. The first property is the unexpectedly high selectivity of zeolite X for isobutane as compared with lower weight saturated aliphatics. As previously discussed and illustrated by Table I, zeolite X is capable of adsorbing all of these compounds based on a consideration of the zeolite X pore size and critical molecular dimensions of the compounds. For example, the pores of zeolite X are sufficiently large and in fact do receive methane and octane.

Based on these considerations, one skilled in the art would logically conclude that zeolite X would not possess any particular selectivity for isobutane in preference to the other constituents of the present vapor mixture. Contrary to these expectations, it has been discovered that zeolite X possesses an extremely strong selectivity for isobutane to the substantial exclusion of lower weight aliphatics such as methane.

Another interrelated property is the relationship of the boiling point or vapor tension characteristics of an individual fluid or clearly related type of fluid to the capacity of the crystalline zeolite X to adsorb the fluid at a given temperature and pressure. More specifically, it has been discovered that a relationship exists between the amount of fluid adsorbed and the temperature ratio $T_2/T_1$ where $T_1$ is the temperature, in degree Kelvin, at which the adsorption is carried out, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point of the adsorbate at the adsorption conditions.

This relationship is clearly shown in FIGURE 1 which is a plot of the weight percent of $C_1$–$C_8$ saturated aliphatic hydrocarbons adsorbed versus the temperature ratio $T_2/T_1$ for zeolite X. Table II is a summary of the data from which FIGURE 1 was prepared. The $T_2$ values were read from the vapor pressure tables in "Industrial and Engineering Chemistry," vol. 39, page 517, April 1947.

It was unexpectedly discovered that all of the saturated aliphatic hydrocarbons having less than nine carbon atoms per molecule, whether straight chain or branched, exhibit the same temperature ratio $T_2/T_1$ relationship to weight percent of hydrocarbon adsorbed on zeolite X, provided, of course, that the size of the molecule is not so large as to prevent entry into the pores of the molecular sieve. That is, for a given $T_2/T_1$ value, the weight percent of hydrocarbon adsorbed will be the same for all of the previously defined hydrocarbons. The present invention utilizes this relationship to provide a novel separation process.

TABLE II

| Hydrocarbon Adsorbate | Pressure, mm. Hg | Weight Percent Adsorbed | Temperature, °K. | | $T_2/T_1$ |
|---|---|---|---|---|---|
| | | | $T_1$ | $T_2$ | |
| $CH_4$ | 500 | Less than 1 | 298 | 106 | 0.36 |
| $C_2H_6$ | 5 | 0.2 | 298 | 125 | 0.42 |
| | 25 | 0.8 | 298 | 145 | 0.49 |
| | 300 | 8.3 | 298 | 168 | 0.56 |
| | 700 | 10.2 | 298 | 183 | 0.61 |
| $C_3H_8$ | 1 | 0.8 | 298 | 144 | 0.48 |
| | 5 | 3.1 | 298 | 158 | 0.53 |
| | 4 | 2.6 | 298 | 161 | 0.54 |
| | 25 | 11.1 | 298 | 174 | 0.58 |
| | 700 | 14.6 | 298 | 233 | 0.78 |
| n-$C_4H_{10}$ | 700 | 17.8 | 298 | 270 | 0.91 |
| | 710 | 17.6 | 298 | 270 | 0.91 |
| | 729 | 17.6 | 298 | 271 | 0.91 |
| i-$C_4H_{10}$ | 0.2 | 2.4 | 298 | 152 | 0.51 |
| | 5.5 | 11.5 | 298 | 180 | 0.60 |
| | 400 | 18.4 | 298 | 246 | 0.83 |
| n-$C_5H_{12}$ | 205 | 18.4 | 298 | 276 | 0.93 |
| | 224 | 19.3 | 298 | 277 | 0.93 |
| n-$C_6H_{14}$ | 0.18 | 4.8 | 298 | 202 | 0.68 |
| | 0.22 | 10.2 | 298 | 204 | 0.69 |
| | 20 | 19.2 | 298 | 259 | 0.87 |
| n-$C_8H_{18}$ | 11.0 | 30 | 298 | 294 | 0.99 |
| | 2.3 | 20.8 | 298 | 277 | 0.93 |
| | 5.0 | 20.8 | 298 | 280 | 0.94 |
| | 2.3 | 14.2 | 423 | 277 | 0.66 |
| | 5.0 | 14.2 | 423 | 280 | 0.66 |

The present invention combines the previously discussed properties of zeolite X in such a manner that a novel process is provided for separating isobutane from a vapor mixture thereof with lower molecular weight saturated aliphatic hydrocarbons. In its broadest form, the process consists of contacting the vapor mixture with a bed of at least partially dehydrated crystalline zeolite X adsorbent material. The isobutane depleted vapor mixture is then discharged from the crystalline zeolite X bed. Such contact is preferably being effected under conditions such that the temperature ratio $T_2/T_1$ with respect to the inlet end of the bed and with respect to isobutane is between 0.50 and 1.0, where $T_1$ is the adsorption temperature and is less than 973° K., and $T_2$ is the temperature at which isobutane has a vapor pressure equal to its partial pressure in the vapor mixture. The lower limit of 0.50 for the temperature ratio $T_2/T_1$ is fixed by the discovery that below this value there is a smaller percentage change in adsorption capacity per unit change in the temperature ratio. In contrast, above 0.50 there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below 0.50 than if it is maintained above this value in accordance with the invention. Also, the temperature ratio of 0.50 corresponds to a bed loading of about 1.2 weight percent adsorbate and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, condensation of the aliphatic hydrocarbon will occur, thereby essentially eliminating the sieving action of the zeolite X adsorbent. The broad upper limit of 973° K. for $T_1$ is due to the fact that above this temperature, the crystal structure of zeolite X will be disrupted or damaged with consequent loss of adsorption capacity and reduction in pore size, thereby fundamentally changing its adsorptive characteristics.

For recovery of isobutane from methane fuel gases, the present adsorption process is most efficiently performed if $T_1$, the adsorption temperature is less than 644° K. but higher than 233° K. This is for the reason that above such range, the saturated aliphatic hydrocarbons in contact with zeolite X will tend to isomerize, hydrogenate, aromatize and polymerize, all of which will clog the pores and cause loss of capacity of zeolite X molecular sieve. Below 233° K. relatively economical refrigerants such as Freon-12 cannot be employed, thereby necessitating more expensive refrigerating systems. Also, mechanical properties of metals deteriorate rapidly below about 233° K., so that special construction materials must be employed for adsorbers operating in this low temperature range. The increase in zeolite X adsorptive capacity for ethane and propane at reduced temperatures justifies the employment of refrigeration down to the 233° K. level. Furthermore, for maximum efficiency, $T_2$ is preferably below 569° K. which is the critical temperature of octane. This is to more effectively utilize the adsorptive capacity of zeolite X.

The present invention also contemplates a process for continuously separating isobutane from a vapor mixture thereof with lower molecular weight saturated aliphatic hydrocarbons. This continuous process includes two steps, an adsorption stroke and a regeneration stroke. The adsorption stroke is the same as the previously described adsorption where the temperature ratio $T_2/T_1$ is between 0.50 and 1.0, and the broad range for $T_1$ is less than 973° K. In the regeneration stroke, at least part of the adsorbed isobutane is removed by subjecting the zeolite X adsorbent to conditions such that the temperature ratio $T_2/T_1$ at the end of the regeneration stroke, with respect to isobutane, is less than the temperature ratio at the end of the adsorption stroke. Also, the difference in total adsorbate loading between the ends of the adsorption and regeneration strokes is at least one weight percent for increased efficiency of the overall continuous process. A lower differential adsorbate loading would entail prohibitively large adsorber units. During the regeneration stroke, $T_1$ is the regeneration temperature and is less than 973° K. for the broad range, and $T_2$ is the temperature at which the previously mentioned adsorbed isobutane has a vapor pressure equal to the partial pressure of the hydrocarbon over the zeolite X bed at the end of the regeneration. It will be understood by those skilled in the art that at least two adsorbent beds may be provided, with one bed on adsorption stroke and the other bed on regeneration stroke. The respective flows are then periodically switched when the first bed becomes loaded with the adsorbate, so that the latter is placed on regeneration stroke and the second bed is placed on-stream.

For recovery of isobutane from mixtures which contain methane as a major component, the continous process is most efficiently performed if $T_1$, the adsorption temperature, is less than 644° K. but higher than 233° K. for previously stated reasons. Also, for maximum efficiency during the adsorption stroke, $T_2$ is below 569° K. During the regeneration stroke, $T_1$, is preferably below 644° K and above 233° K., also for the previously discussed reasons.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke the ratio may be adjusted for favorable operation by varying either or both the temperature and the pressure.

The many advantages of the invention are illustrated by Examples I and II. Although these examples specifically relate to adsorption of propane and ethane, respectively, the adsorption of isobutane would be effected in an analogous manner.

Example I

A vapor mixture is provided containing 0.01 mole fraction of propane, the balance being methane. The mixture is at a total pressure of 500 p.s.i.a. The mixture is to be contacted with a bed of zeolite X at a temperature of 75° C. (348° K.). Furthermore, the zeolite X bed is to be regenerated to effect continuous operation.

The potential capacity of the bed to adsorb these hydrocarbons at the bed inlet section may be determined as follows: Since the partial pressure of propane at the inlet will be 5 p.s.i.a., $T_2$ will be 205° K., as read from the previously referenced vapor pressure table. Accordingly, $T_2/T_1$ will be 205/348, or 0.59. This temperature ratio will provide a loading of 10.2 weight percent of propane on the zeolite X adsorbent as determined by a reading of the FIGURE 1 graph.

The potential capacity of the adsorbent bed inlet end for methane may be determined in a similar manner. $T_2$ is 181° K., $T_2/T_1$ is 0.52 and the loading for methane is 2.2 weight percent.

If it is desired to completely eliminate propane from the effluent, the adsorption stroke may be terminated when traces of propane first appear in the effluent. If traces may be tolerated in the effluent, the process may be terminated when the propane content of the effluent reaches the predetermined level.

During the regeneration stroke the bed temperature is raised to 360° K. (87° C.) while simultaneously reducing the pressure of the bed to 1 p.s.i.a. The $T_2$ value for propane at these conditions is 180° K. Under these conditions, the $T_2/T_1$ ratio will be 0.50 and the residual loading of propane will be reduced to 1.2 weight percent.

Example II

A vapor mixture is provided containing 0.1 mole fraction of ethane, the balance being methane. The mixture is at a total pressure of 600 p.s.i.a. The mixture is to be contacted with a bed of zeolite X at a temperature of 93° C. (366° K.). Furthermore, the zeolite X bed is to be regenerated to effect continuous operation.

The potential capacity of the bed to adsorb these hydrocarbons at the bed inlet section may be determined as follows: Since the partial pressure of ethane at the inlet will be 60 p.s.i.a., $T_2$ will be 216° K. as read from the previously referenced vapor pressure table. Accordingly, $T_2/T_1$ will be 216/366, or 0.59. This temperature ratio will provide a loading of about 10.2 weight percent of ethane on zeolite X adsorbent as determined by a reading of the FIGURE 1 graph.

The potential capacity of the adsorbent bed inlet end for methane may be determined in a similar manner. $T_2$ is 183, $T_2/T_1$ is 0.50, and the loading for methane is about 1.2 weight percent.

If it is desired to completely eliminate ethane from the effluent, the adsorption stroke may be terminated when traces of ethane first appear in the effluent. If traces may be tolerated in the effluent, the process may be terminated when the ethane content of the effluent reaches the predetermined level.

During the regeneration stroke, the bed temperature is raised to 366° K. while simultaneously reducing the pressure of the bed to 14.7 p.s.i. The $T_2$ value for ethane at these conditions is 184° K. The $T_2/T_1$ ratio is then 184/366, or 0.50 and the residual loading of ethane will be reduced to about 1.2 weight percent.

Zeolite X exhibits a strong preference for water, a polar molecule, over the saturated normal hydrocarbons, non-polar molecules. For this reason when the vapor mixture from which isobutane is being separated contains water vapor, the adsorbent will lose capacity. Occasional regeneration under conditions which will effect removal of adsorbed water may be desirable to improve or restore the capacity of zeolite X for the isobutane. Such regeneration may be done by heating the adsorbent to a temperature of about 350° C. but not higher than 600° C. with a purge gas or at vacuum pressures.

What is claimed is:

1. A process for separating isobutane from a vapor mixture thereof with at least one lower molecular weight saturated aliphatic hydrocarbon which comprises contacting said vapor mixture with a bed of at least partially dehydrated crystalline zeolite X adsorbent material, and thereafter discharging the non-occluded isobutane depleted vapor mixture from said bed.

2. A process in accordance with claim 1 wherein said adsorbent material is sodium zeolite X.

3. A process for separating isobutane from a vapor mixture thereof with at least one lower molecular weight saturated aliphatic hydrocarbon which comprises contacting said vapor mixture with a bed of at least partially dehydrated crystalline zeolite X adsorbent material under conditions such that the ratio of the temperature in degrees Kelvin at which said isobutane has a vapor pressure equal to its partial pressure in said vapor mixture to the temperature in degress Kelvin at which the adsorption process is carried out is between 0.50 and 1.0; and such that said adsorption temperature is less than 973° K.; and thereafter discharging the non-occluded isobutane depleted vapor mixture from said bed.

4. A process in accordance with claim 3 wherein said adsorbent material is sodium zeolite X.

5. A process for continuously separating isobutane from a vapor mixture thereof with at least one lower molecular weight saturated aliphatic hydrocarbon which comprises contacting said vapor mixture in an adsorption stroke with a bed of at least partially dehydrated crystalline zeolite X adsorbent material under conditions such that the ratio of the temperature in degrees Kelvin at which said isobutane has a vapor pressure equal to its partial pressure in said vapor mixture to the temperature in degrees Kelvin at which the adsorption process is carried out is between 0.50 and 1.0, and such that said adsorption temperature is less than 973° K.; thereafter, discharging the isobutane depleted vapor mixture from said bed; subsequently removing at least part of the adsorbed isobutane by subjecting the zeolite X adsorbent to a regeneration stroke under conditions such that the difference in total adsorbate loadings between the ends of the adsorption and regeneration strokes is at least one weight percent, and such that the ratio of the temperature in degrees Kelvin at which isobutane has a vapor pressure equal to the partial pressure of such isobutane over the zeolite X bed at the end of the regeneration stroke to the temperature of regeneration in degress Kelvin is less than the said ratio of temperature during the adsorption stroke and such that the said temperature of regeneration is less than 973° K.

6. A process in accordance with claim 5 wherein said adsorbent material is sodium zeolite X.

7. A process in accordance with claim 1 wherein the contact between said vapor mixture and the zeolite X adsorbent material is effected at a temperature below 973° K.

8. A process in accordance with claim 1 wherein methane is the lower molecular weight hydrocarbon, and the contact between said vapor mixture and the zeolite X adsorbent material is effected at a temperature below 644° K. and above 233° K.

9. A process in accordance with claim 3 wherein methane is the lower molecular weight hydrocarbon, and the adsorption temperature is below 644° K. and above 233° K., and the temperature at which the higher molecular weight hydrocarbon has a vapor pressure equal to its partial pressure is below 569° F.

10. A process in accordance with claim 5 wherein methane is the lower molecular weight hydrocarbon, and the adsorption and regeneration temperatures are below 644° K. and above 233° K.

11. A process in accordance with claim 10 wherein the temperature at which said isobutane has a vapor pressure equal to its partial pressure in said vapor mixture is below 569° F.

References Cited in the file of this patent

UNITED STATES PATENTS

| | | |
|---|---|---|
| 2,306,610 | Barrer | Dec. 29, 1942 |
| 2,519,342 | Berg | Aug. 22, 1950 |
| 2,882,244 | Milton | Apr. 14, 1959 |

OTHER REFERENCES

Barrer et al.: Occlusions of Hydrocarbons by Chabazite and Analcite, Transactions of the Faraday Soc. (London), vol. 40 (1944), pp. 195–206.

Barrer-Molecular-Sieve Action of Solids, Quarterly Review (1949, Chemical Society, London, pp. 293–320).